United States Patent [19]

Krueger et al.

[11] Patent Number: 5,054,032
[45] Date of Patent: Oct. 1, 1991

[54] GAS LASER HOUSING

[75] Inventors: Hans Krueger, Munich; Wolfgang Welsch, Baldham; Michael Schulz, Bexbach; Heinz Pape, Munich, all of Fed. Rep. of Germany

[73] Assignee: Siemens Aktiengesellschaft, Munich, Fed. Rep. of Germany

[21] Appl. No.: 527,873

[22] Filed: May 24, 1990

[30] Foreign Application Priority Data

May 31, 1989 [DE] Fed. Rep. of Germany ....... 3917744

[51] Int. Cl.$^5$ .................................................. H01S 3/08
[52] U.S. Cl. ...................................... 372/107; 372/33; 372/61
[58] Field of Search .................. 372/107, 33, 61, 65

[56] References Cited

U.S. PATENT DOCUMENTS

| 3,916,337 | 10/1975 | Kindl et al. | 372/61 |
| 4,081,762 | 3/1978 | Golser et al. | 372/107 |
| 4,238,743 | 12/1980 | Golser et al. | 372/107 |
| 4,631,727 | 12/1986 | Crane et al. | 372/33 |
| 4,799,232 | 1/1989 | Welsch | 372/61 |
| 4,943,972 | 7/1990 | Krueger et al. | 372/107 |

Primary Examiner—Frank Gonzalez
Assistant Examiner—Susan S. Morse
Attorney, Agent, or Firm—Hill, Van Santen, Steadman & Simpson

[57] ABSTRACT

A gas laser housing having a housing and a metal cap attached thereto, includes a mirror mount attached to the metal cap. The mirror mount is provided with an annular region of reduced diameter affixed to the metal cap to absorb mechanical stresses and thereby prevents stress crack corrosion at the circumference of the housing tube.

8 Claims, 1 Drawing Sheet

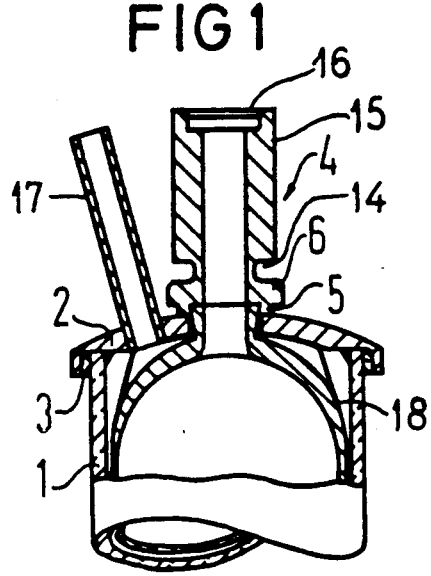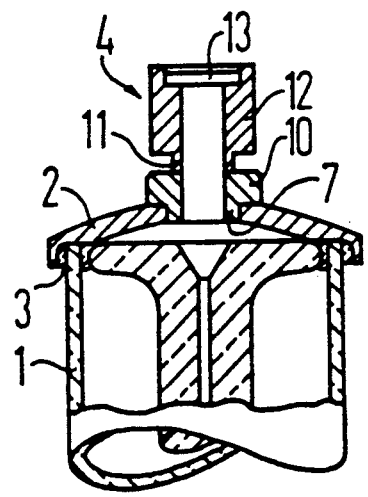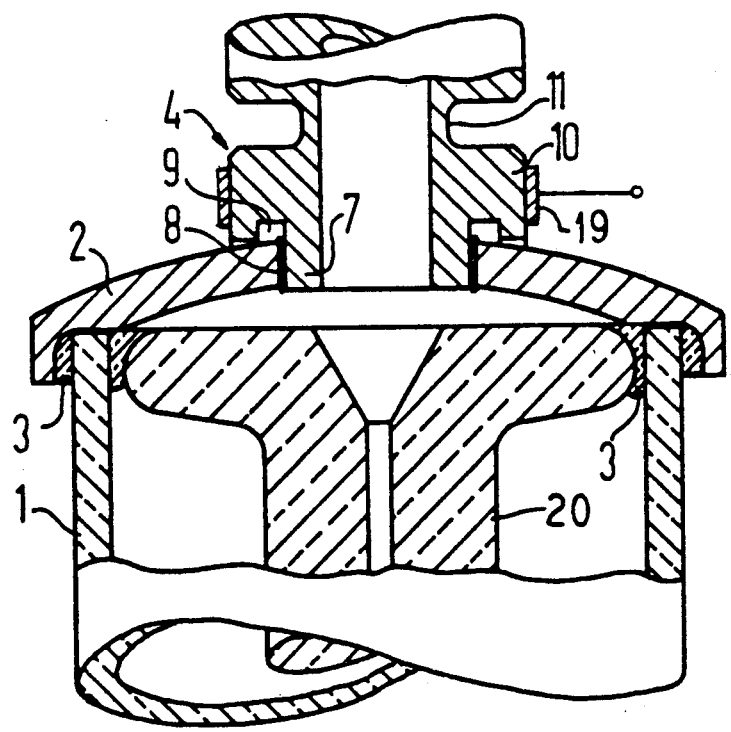

GAS LASER HOUSING

BACKGROUND OF THE INVENTION

1. Field of the Invention

The present invention relates generally to a gas laser and, more particularly, to a gas laser housing having a housing tube of glass, at least one metal cap adjacent the housing tube, and a mirror mount secured to the metal cap with a resonator mirror held therein.

2. Description of the Related Art

A gas laser has been proposed in German application P 39 12 609.9. However, it has been shown that cracks can occur in such gas lasers in the housing tube in the proximity of the metal caps following the soldering process and after the occurrence of subsequent temperature stresses as well or due to aging, which results in stress corrosion cracking.

SUMMARY OF THE INVENTION

An object of the present invention is to avoid cracking in a gas laser housing. This and other objects and advantages of the invention are achieved in a gas laser having a housing tube of glass with at least one metal cap attached thereto, a mirror mount secured to the metal cap, and a resonator mirror held therein. The co-efficient of thermal expansion of the metal cap is adapted to that of the housing tube and differs from the mirror mount. The mirror mount includes a first annular region that is affixed to the metal cap, and the thermally produced mechanical stresses between the metal cap and the mirror mount in a region of mutual fixing of these two parts are reduced, avoided, or held constant.

The present invention is based on the perception that a deformation of the metal cap occurs due to differences in thermal expansion in the region of the attachment of the mirror mount to the metal cap. This deformation particularly produces tensile stresses during cooling of the outside of the housing tube, and these tensile stresses in turn cause the observed cracks in the laser housing. Every change in the mechanical stresses, or forces between the mirror mount and the metal cap is transmitted to the housing tube, and it is particularly the tensile stresses which act on the outside surfaces of the housing tube and that proceed parallel to the axis of the housing tube to cause damage thereto. These stresses primarily arise during cooling of the laser, since the coefficient of thermal expansion of the mirror mount is fundamentally higher than that of the metal cap that is, in turn, a result of the materials from which the mirror or the housing tube are formed.

A simple and advantageous embodiment of the present invention provides a first annular region of the mirror mount which has smaller outside diameter than an adjacent, second annular region. For reasons of mechanical stability and because an adjustment groove is usually provided in the mirror mount, the second annular region has a relatively large outside diameter. It is adequate, therefore, to form a narrow first region adjacent the metal cap with a smaller diameter to reduce the tensions in the metal cap.

A voltage lead is frequently applied to the second annular region. In these cases, it is recommendable that the second annular region, which has the larger outside diameter, be adjacent the first annular region in an axial direction of the mirror mount where the first annular region has the smaller outside diameter. In this instance, it is preferred that the second annular region contains an undercut extending beneath the second region from the first region, since the first annular region is generally soldered to the metal cap. The undercut prevents the solder from joining the second annular region to the cap at least in a radial direction outside of the undercut. As a result thereof, the second annular region may be brought directly up to the metal cap, since the solder does not undergo any noteworthy capillary effect in the region of the undercut and does not flow into the gap to the second annular region.

A further advantageous embodiment is provided by a mirror mount composed of two parts which have different coefficients of thermal expansion. The first of the two parts is an annular part affixed to the metal cap and having a coefficient of thermal expansion adapted to that of the metal cap, while the second part is attached to the first part at a transition region and has the mirror mounted thereon, preferably being of a material having a coefficient of thermal expansion matched to the mirror. The transition between the two parts of the mirror mount is advantageously provided by a region of a smaller diameter and preferably in the region of an adjustment groove of the type which is known. In this embodiment, the described decrease in the cross section can, but need not be provided. An easily workable material which is, in one example, used for the annular part adjoining the metal cap as a thermal coefficient of expansion lying between that of the metal cap and that of an adjoining second part.

BRIEF DESCRIPTION OF THE DRAWINGS

FIG. 1 is an axial cross section of an end portion of a gas laser housing showing a mirror mount in accordance with the principles of the present invention;

FIG. 2 is an enlarged axial cross section of a second embodiment of the gas laser housing of the invention; and FIG. 3 is an axial cross section of a further embodiment of the present invention.

DETAILED DESCRIPTION OF THE PREFERRED EMBODIMENTS

In FIG. 1 is shown a sectional and broken view of a housing tube 1 soldered to a metal cap 2 with a glass solder 3. A mirror mount 4 is soldered to the metal cap 2. An annular region 5, also referred to as a transition region, of the mirror mount 4, has a smaller diameter than at least one adjoining region of the mirror mount 4, the smaller diameter first annular region 5 being affixed to the metal cap 2. Adjoining the smaller diameter first annular region 5 is a second annular region 6 of a larger diameter which lends the necessary stability to the mirror mount 4. As is known, an adjustment groove 14 is provided in the mirror mount 4 between the second annular region 6 and a further region 15 of the mirror mount 4. The adjustment groove 14 facilitates adjustment of resonator mirror alignment and spacing. In the end of the mirror mount 4 is provided a resonator mirror 16. Of course, a second resonator mirror is provided at an opposite end of the laser housing. Also shown in FIG. 1 is a gas filler tube 17 connected in the metal cap 2, as well as a cathode 18.

To prevent thermal stressing between the glass housing tube 1 and the metal cap 2, the metal cap 2 is of a material having a coefficient of thermal expansion approximately equal to the coefficient of thermal expansion of the glass housing tube. The resonator mirror 16, however, has a somewhat different coefficient of thermal expansion, and, thus the mirror mount 15 is of a material having a coefficient of thermal expansion matched approximately to that of the resonator mirror 16. Therefore, to absorb the mechanical stresses which occur during heating and cooling of the laser housing, the transition region 5 is provided.

Referring to FIG. 2, a first annular part 7 of the mirror mount 4 is soldered into a corresponding bore in the metal cap or disc 2. An undercut 9 is provided extending partially beneath a annular region 10 of larger diameter relative to the first annular part, or transition region, 7. The solder 8 which connects the mirror mount 4 to the metal cap 2 extends up to the undercut 9, but is prevented thereby from flowing farther. In the illustrated embodiment, the annular region 10 extends up to the metal cap 2 but is not positively affixed thereto since it is free of the solder 8. This embodiment enables a contact ring 19 to be attached to the annular region 10 without the contact ring 19 being capable of sliding into a gap between the metal cap 2 and the second annular region 10. The contact ring 19 is connectable to a voltage. A laser capillary 20 is also shown in FIG. 2.

In FIG. 3 is shown an embodiment similar to that shown in FIG. 2 that does not include an undercut 9. Instead, the annular regions 7 and 10 are composed of a material having a coefficient of thermal expansion adapted to that of the metal cap, whereas an outside part 12 of the mirror mount 4 has a coefficient of thermal expansion adapted to that of a resonator mirror 13. The two portions 10 and 12 of the mirror mount 4 only adjoin one another in a region of the adjustment groove 11, which is of a smaller diameter than the adjoining regions. It is also contemplated in conjunction with FIG. 3, that the portion 7 and 10 have a coefficient of thermal expansion lying between the temperature coefficient of the outside part and the coefficient of the metal cap 2.

Thus, there has been shown and described a gas laser housing having a transition region in the mirror mount at which temperature induced stress is absorbed to prevent or at least reduce mechanical stresses between the metal cap 2 and the housing tube 1. This prevents stress crack corrosion in the glass housing tube 1 adjacent the metal cap 2.

Although other modifications and changes may be suggested by those skilled in the art, it is the intention of the inventors to embody within the patent warranted hereon all changes and modifications as reasonably and properly come within the scope of their contribution to the art.

We claim:

1. A gas laser housing, comprising:
a housing tube of glass;
at least one metal cap on said housing tube, said at least one metal cap having a first coefficient of thermal expansion adapted to a coefficient of thermal expansion of said housing tube;
a mirror mount having at least a portion of a second coefficient of thermal expansion that is different from the first coefficient of thermal expansion of said at least one metal cap;
a resonator mirror held in said mirror mount;
said mirror mount having an annular transition region between said at least one metal cap and said resonator mirror, said transition region absorbing thermal mechanical stresses due to differences between said first and second coefficients of thermal expansion so that thermally produced mechanical stresses between said at least one metal cap and said mirror mount in a region of mutual fastening is minimized, said annular transition region of said mirror mount being of a smaller diameter than an adjoining annular region of said mirror mount;
a second annular region of said mirror mount lying in an axial direction relative to said annular transition region and being of a larger outside diameter than said annular transition region, said second annular region including an undercut; and
solder affixing said annular transition region to said metal cap, said solder being free of said second annular region at least in a radial direction outside said undercut.

2. A gas laser housing, comprising:
a housing tube of glass;
at least one metal cap on said housing tube, said at least one metal cap having a first coefficient of thermal expansion adapted to a coefficient of thermal expansion of said housing tube;
a mirror mount having at least a portion of a second coefficient of thermal expansion that is different from the first coefficient of thermal expansion of said at least one metal cap;
a resonator mirror held in said mirror mount; and
said mirror mount having an annular transition region between said at least one metal cap and said resonator mirror, said transition region absorbing thermal mechanical stresses due to differences between said first and second coefficients of thermal expansion so that thermally produced mechanical stresses between said at least one metal cap and said mirror mount in a region of mutual fastening is minimized, said mirror mount being of first and second parts having different coefficients of thermal expansion, said first part being said annular transition region affixed to said metal cap and having a coefficient of thermal expansion adapted to said metal cap.

3. A gas laser housing as claimed in claim 2, wherein said first and second parts of said mirror mount are connected by a region of reduced diameter.

4. A gas laser housing as claimed in claim 2, wherein said first part of said mirror mount has a coefficient of thermal expansion lying between a coefficient of thermal expansion of said metal cap and a coefficient of thermal expansion of said second part.

5. A gas laser housing, comprising:
a laser housing tube of glass;
a metal cap mounted on at least one end of said laser housing tube, said metal cap having an annular opening;
at least one laser resonator mirror;
a mirror mount affixed between said annular opening in said metal cap and said at least one laser resonator mirror, said mirror mount including a transition region for absorbing mechanical stresses due to differences between a coefficient of thermal expansion of said metal cap and a coefficient of thermal expansion of said laser resonator mirror, said transition region being of a smaller diameter than an axially adjacent second region of said mirror mount, said transition region being immediately adjacent said metal cap, and
an undercut extending from said transition region to beneath said second region.

6. A gas laser housing as claimed in claim 5, wherein said mirror mount has an adjustment groove spaced from said transition region.

7. A gas laser housing as claimed in claim 5, wherein said axially adjacent region of said mirror mount is a second region of a larger diameter than said transition region, and further comprising:
a voltage lead applied to said second region of said mirror mount.

8. A gas laser housing comprising:
a laser housing tube of glass;
a metal cap mounted on at least one end of said laser housing tube, said metal cap having an annular opening;
at least one laser resonator mirror; and
a mirror mount affixed between said annular opening in said metal cap and said at least one laser resonator mirror, said mirror mount including a transition region for absorbing mechanical stresses due to differences between a coefficient of thermal expansion of said metal cap and a coefficient of thermal expansion of said laser resonator mirror, said transition region being of a smaller diameter than an axially adjacent region of said mirror mount, wherein said mirror mount is of two parts of different coefficients of thermal expansion and said transition region is between said two parts.

* * * * *